United States Patent
Liu

(10) Patent No.: US 8,063,589 B2
(45) Date of Patent: Nov. 22, 2011

(54) DRIVE SYSTEM FOR MULTIPLE MOTORS

(75) Inventor: Chih-Jung Liu, Taipei Hsien (TW)

(73) Assignee: Foxnum Technology Co., Ltd., Tu-Cheng, New Taipei (TW)

(*) Notice: Subject to any disclaimer, the term of this patent is extended or adjusted under 35 U.S.C. 154(b) by 544 days.

(21) Appl. No.: 12/274,333

(22) Filed: Nov. 19, 2008

(65) Prior Publication Data

US 2010/0097024 A1 Apr. 22, 2010

(30) Foreign Application Priority Data

Oct. 17, 2008 (CN) .......................... 2008 1 0304976

(51) Int. Cl.
*H02P 5/68* (2006.01)
(52) U.S. Cl. ........................................ 318/112; 318/434
(58) Field of Classification Search .................. 318/112, 318/434
See application file for complete search history.

(56) References Cited

U.S. PATENT DOCUMENTS

| | | | |
|---|---|---|---|
| 5,483,141 A * | 1/1996 | Uesugi | 318/811 |
| 5,859,510 A * | 1/1999 | Dolan et al. | 318/400.28 |
| 7,173,386 B1 * | 2/2007 | Jeon | 318/53 |
| 2004/0239271 A1 | 12/2004 | Matsubara et al. | |

FOREIGN PATENT DOCUMENTS

| CN | 1574602 A | 2/2005 |
|---|---|---|
| JP | 08-266092 A | 10/1996 |

* cited by examiner

*Primary Examiner* — Bentsu Ro
(74) *Attorney, Agent, or Firm* — Altis Law Group, Inc.

(57) ABSTRACT

A drive system for multiple motors includes a first motor, a second motor, a motor drive power supply for supplying power to the first and second motors, a first motor drive amplifier, a second motor drive amplifier, a first overcurrent detection apparatus, and a second overcurrent detection apparatus. The first overcurrent detection apparatus is connected between the motor drive power supply and the first motor drive amplifier for detecting current through the first motor drive amplifier, and comparing the current value to the first overcurrent benchmark value to output an overcurrent detection signal correspondingly. The second overcurrent detection apparatus is connected between the motor drive power supply and the second motor drive amplifier for detecting current through the second motor drive amplifier, and comparing the current value to the second overcurrent benchmark value to output an overcurrent detection signal correspondingly.

11 Claims, 2 Drawing Sheets

DRIVE SYSTEM FOR MULTIPLE MOTORS

BACKGROUND

1. Technical Field

The present disclosure relates to drive systems and, more particularly, to a drive system for multiple motors.

2. Description of the Related Art

A drive system normally includes a plurality of motor drive amplifiers for driving motors, and a motor drive power supply for supplying power to the motor drive amplifiers. In the drive system, various overcurrent benchmark values (values when surpassed by current are considered as overcurrent) are set in an overcurrent detection apparatus for detecting overcurrent. An overcurrent benchmark value is usually equal to a sum of a maximum rated current value of each motor amplifier in the drive system.

However, if one of the motor amplifiers is not working, the maximum rated current value of the motor amplifier is also counted into the overcurrent benchmark value. As a result, the overcurrent detection apparatus cannot detect the overcurrent accurately.

Therefore, what is needed, is a drive system for multiple motors which can accurately detect overcurrent.

DETAILED DESCRIPTION

Figure 1:
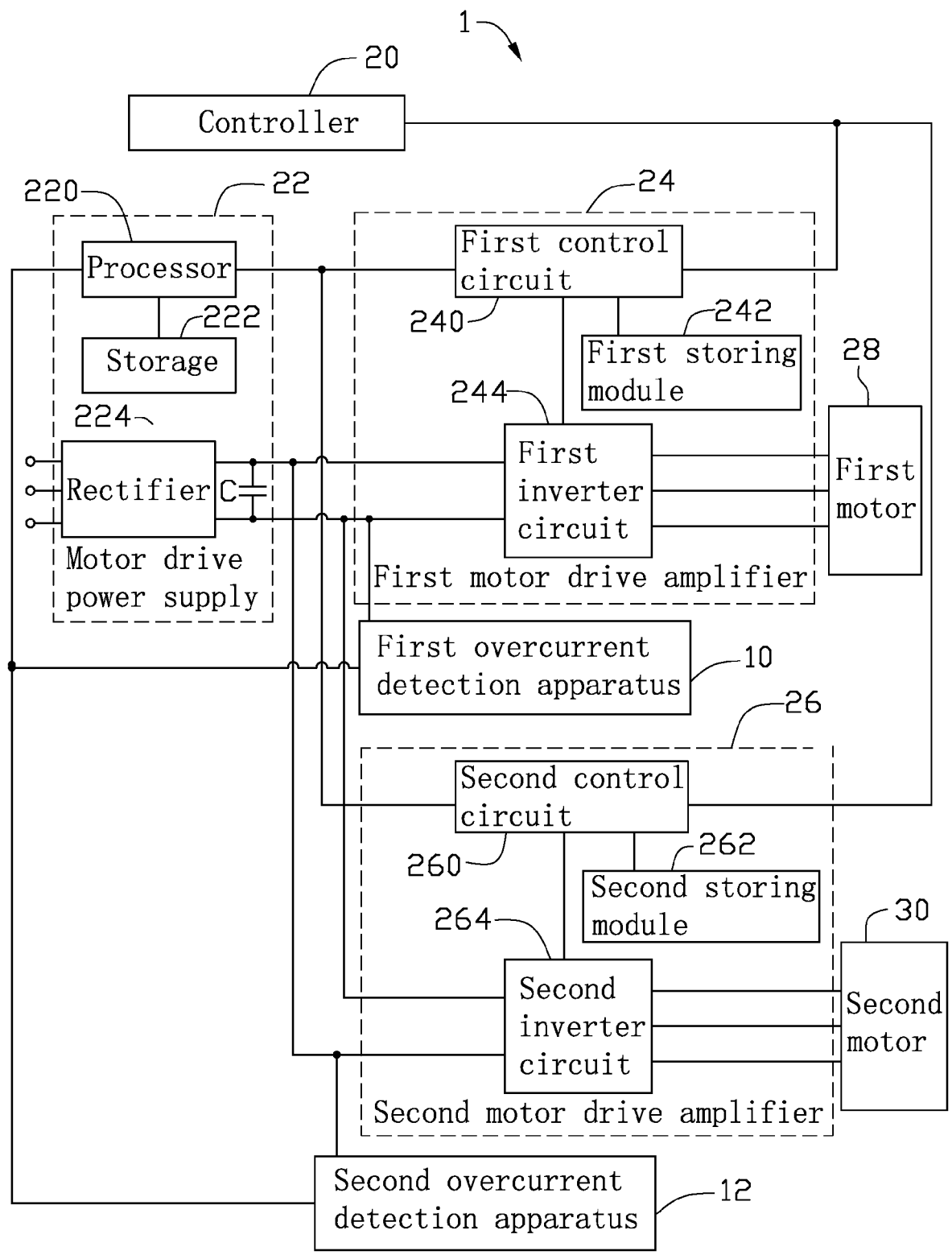
FIG. 1 is a block diagram of an exemplary drive system for multiple motors of the present disclosure, the drive system including a first overcurrent detection apparatus.

Referring to FIG. 1, a drive system 1 includes a first overcurrent detection apparatus 10, a second overcurrent detection apparatus 12, a controller 20, a motor drive power supply 22, a first motor drive amplifier 24, a second motor drive amplifier 26, a first motor 28, and a second motor 30.

The motor drive power supply 22 includes a processor 220, a storage 222, a rectifier 224, and a capacitor C. Types and overcurrent benchmark values for a plurality of motor drive amplifiers, which may have different specifications, are stored in the storage 222. An overcurrent benchmark value of a motor drive amplifier is equal to a maximum rated current of the motor drive amplifier. The rectifier 224 is configured to convert an alternating current (AC) voltage to a direct current (DC) voltage. The capacitor C is connected across two output terminals of the rectifier 224 to smooth the DC voltage from the rectifier 224.

The first motor drive amplifier 24 includes a first control circuit 240, a first storing module 242, and a first inverter circuit 244. The second motor drive amplifier 26 includes a second control circuit 260, a second storing module 262, and a second inverter circuit 264. The first and second storing modules 242, 262 store information, such as the types (make and model) of the first and second motor drive amplifiers 24, 26, respectively. The first and second inverter circuits 244, 264 are configured to convert DC voltage to AC voltage to correspondingly supply power to the first and second motors 28, 30.

The controller 20 is connected to and controls the first and second control circuits 240, 260. The first and second control circuits 240, 260 are also connected to the processor 220 to receive control signals. The first and second inverter circuits 244, 264 are connected to the rectifier 224 to receive DC voltage from the rectifier 224. The first inverter circuit 244 is also connected to the first control circuit 240. The second inverter circuit 264 is also connected to the second control circuit 260. The first and second control circuits 240, 260 are configured for controlling the first and second inverter circuits 244, 264 correspondingly. The first overcurrent detection apparatus 10 is connected between the processor 220 and the first inverter circuit 244 to detect current through the first motor drive amplifier 24. The second overcurrent detection apparatus 12 is connected between the processor 220 and the second inverter circuit 264 to detect current through the second motor drive amplifier 26.

When the drive system 1 is on, the controller 20 outputs a control signal to the first and second control circuits 240, 260. The first and second control circuits 240, 260 activate the first and second inverter circuits 244, 264 to supply power to the first and second motors 28, 30 correspondingly. In addition, the processor 220 reads what type the motor amplifiers 24, 26 are according to the information stored in the first and second storing modules 242, 262, and retrieves overcurrent benchmark values, according to the type of the first and second motor drive amplifiers 24, 26 stored in the storage 222.

Figure 2:
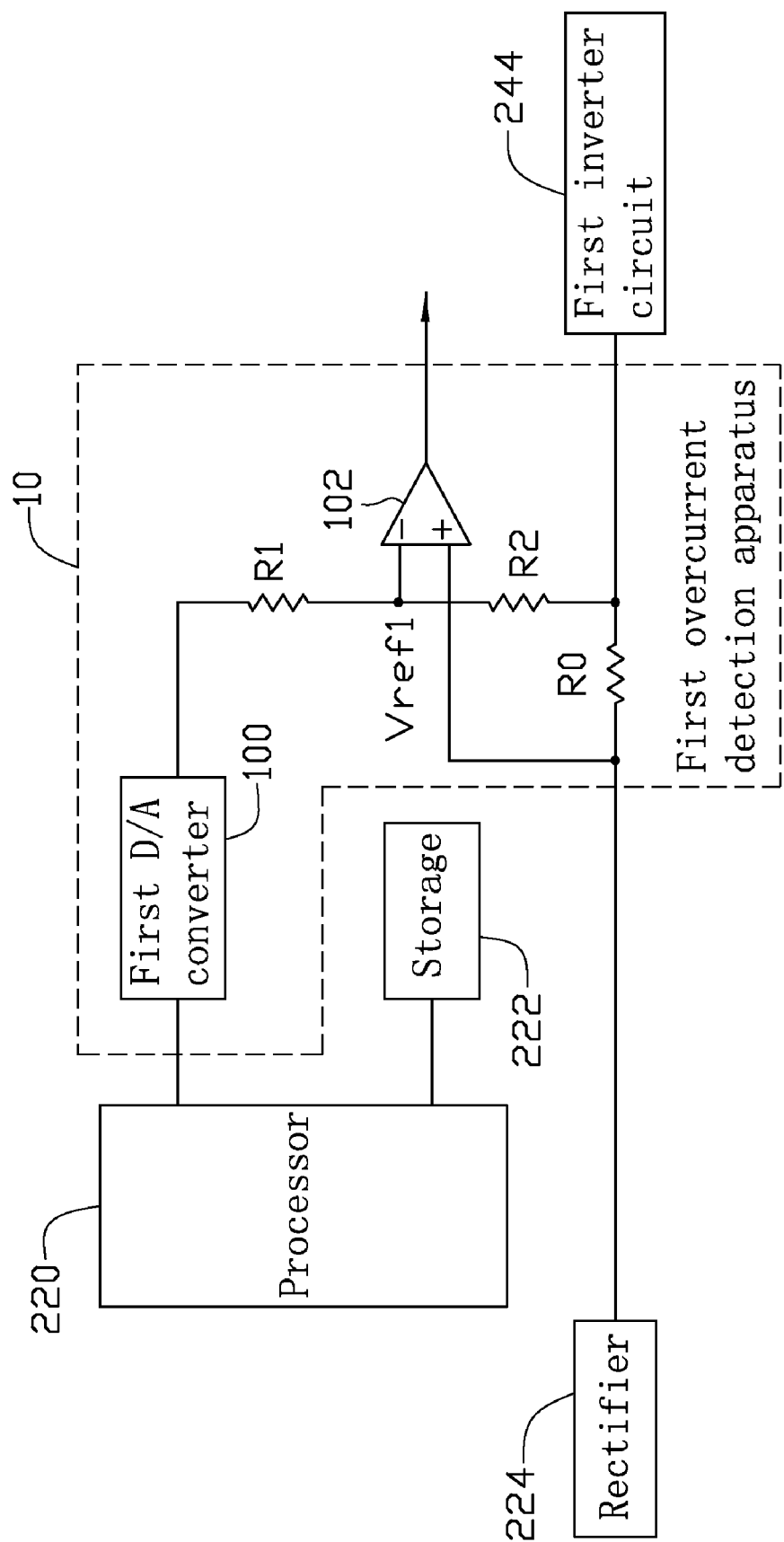
FIG. 2 is a circuit diagram of one embodiment of the first overcurrent detection apparatus of FIG. 1.

Referring to FIG. 2, the first overcurrent detection apparatus 10 includes a first digital/analog (D/A) converter 100, a first comparator 102, and three resistors R0-R2. An input terminal of the first D/A converter 100 is connected to the processor 220. An output terminal of the first D/A converter 100 is connected to a first end of the resistor R0 via the resistors R1, R2 in series. The first end of the resistor R0 is also connected to the first inverter circuit 244. A second end of the resistor R0 is connected to the rectifier 224. A first terminal of the comparator 102 is connected to a node between the resistor R1 and the resistor R2. A second terminal of the comparator 102 is connected to the second end of the resistor R0.

The D/A converter 100 is configured to convert the overcurrent benchmark value of the first motor drive amplifier 24 stored in the storage 222 into an analog voltage, and apply the analog voltage to a serial circuit of the resistors R1 and R2. The analog voltage corresponding to the overcurrent benchmark value is divided by the resistors R1 and R2, and a resultant divided voltage is input to the first terminal of the comparator 102 as an overcurrent detection reference value Vref1.

Current to the first motor drive amplifier 24 flows through the resistor R0, and a voltage drop caused by the resistor R0 is input to the second terminal of the comparator 102. If the voltage drop caused by the resistor R0 exceeds the overcurrent detection reference value Vref1, a high-level overcurrent detection signal is output from an output terminal of the comparator 102.

The second overcurrent detection apparatus 12 works in the same manner as the first overcurrent apparatus 10. In the present embodiment, the drive system 1 includes two motor drive amplifiers. In other embodiments, the drive system 1 may include more than two motor drive amplifiers to drive more than two motors, and include more than two overcurrent detection apparatuses correspondingly. Each overcurrent detection apparatus is connected between the corresponding motor drive amplifier and the rectifier 224. All the overcurrent detection apparatuses are connected to the processor 110.

The foregoing description of the various inventive embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skill in the art to utilize the disclosure and various embodiments and with various modifications as are suited to the particular use contemplated. Alternately embodiments will become apparent to those of ordinary skill in the art to which the present disclosure pertains without departing from its spirit and scope. Accordingly, the scope of the present disclosure is defined by the appended claims rather than the foregoing description and the various inventive embodiments described therein.

What is claimed is:

1. A drive system for multiple motors, comprising:
   a first motor;
   a second motor;
   a motor drive power supply for supplying power to the first and second motors;
   a first motor drive amplifier connected between the motor drive power supply and the first motor, for driving the first motor, wherein a first overcurrent benchmark value of the first motor drive amplifier is stored in the motor drive power supply;
   a second motor drive amplifier connected between the motor drive power supply and the second motor, for driving the second motor, wherein a second overcurrent benchmark value of the second motor drive amplifier is stored in the motor drive power supply;
   a first overcurrent detection apparatus connected between the motor drive power supply and the first motor drive amplifier capable of detecting current through the first motor drive amplifier, and comparing the current value to the first overcurrent benchmark value to output an overcurrent detection signal correspondingly, the first overcurrent detection apparatus comprising:
   a first resistor;
   a second resistor connected to the first resistor in series;
   a third resistor comprising a first end connected to the motor drive power supply;
   a first digital/analog (D/A) converter for converting the first overcurrent benchmark value of the first motor drive amplifier stored in the motor drive power supply into analog voltage, an input terminal of the first D/A converter connected to the motor drive power supply, and an output terminal of the first D/A converter connected to a second end of the third resistor via the first and second resistors; and
   a first comparator comprising a first terminal connected to a node between the first and second resistor to receive a first overcurrent detection reference value, and a second terminal connected to the first end of the third resistor to receive current through the first motor drive amplifier, wherein the first overcurrent detection reference value is maintained from dividing the analog voltage by the first and second resistors; wherein the first comparator outputs an overcurrent detection signal in response to the current inputted to the second terminal of the first comparator being more than the overcurrent detection reference value; and
   a second overcurrent detection apparatus connected between the motor drive power supply and the second motor drive amplifier capable of detecting current through the second motor drive amplifier, and comparing the current value to the second overcurrent benchmark value to output an overcurrent detection signal correspondingly.

2. The drive system of claim 1, wherein the motor drive power supply comprises:
   a storage for storing the first and second overcurrent benchmark values of the first and second motor drive amplifiers;
   a rectifier connected to the first and second motor drive amplifiers via two output terminals of the rectifier, and capable of converting alternating current voltage to direct current (DC) voltage, and outputting the DC voltage to the first and second motor drive amplifiers; and
   a processor connected to the first and second motor drive amplifiers, the storage, and the first and second overcurrent detection apparatuses, and capable of transmitting the first and second overcurrent benchmark values from the first and second motor drive amplifiers to the first and second overcurrent detection apparatuses correspondingly.

3. The drive system of claim 2, wherein a capacitor is connected across the two output terminals of the rectifier to smooth DC voltage from the rectifier.

4. The drive system of claim 2, further comprising a controller connected to the first and second motor drive amplifiers, wherein the controller is capable for controlling the first and second motor drive amplifiers to drive the first and second motors.

5. The drive system of claim 4, wherein the first motor drive amplifier comprises:
   a first control circuit connected between the controller and the processor;
   a first storing module connected to the first control circuit, capable for storing a type of the first motor drive amplifier; and
   a first inverter circuit connected to the first control circuit, the rectifier, and the first motor, capable for supplying power from the rectifier to the first motor according to a first control signal from the first control circuit;
   wherein the processor reads a type of the first motor drive amplifier from the first storing module via the first control circuit, and reads a maximum rated current value from the storage according to the type of the first motor drive amplifier.

6. A drive system for multiple motors comprising:
   a plurality of motors;
   a motor drive power supply for supplying power to the plurality of motors;
   a plurality of motor drive amplifiers, wherein each motor amplifier is connected between the motor drive power supply and a corresponding motor, for driving the corresponding motor, wherein a maximum rated current value of each motor amplifier is stored in the motor drive power supply; and
   a plurality of overcurrent detection apparatuses, wherein each overcurrent detection apparatus is connected between the motor drive power supply and a corresponding motor drive amplifier for detecting current through the corresponding motor drive amplifier, and comparing the maximum rated current value to the current corresponding to output an overcurrent detection signal correspondingly, each overcurrent detection apparatus comprising:
   a first resistor;
   a second resistor connected to the first resistor in series;
   a third resistor comprising a first end connected to motor drive power supply;
   a first digital/analog (D/A) converter for converting an overcurrent benchmark value of a corresponding motor drive amplifier stored in the motor drive power supply into analog voltage, wherein an input terminal of the first D/A converter is connected to the motor drive power supply, and an output terminal of the first D/A converter is connected to a second end of the third resistor via the first and second resistors; and a first comparator comprising a first terminal connected to a node between the first and second resistor to receive an overcurrent detection reference value, and a second terminal connected to the first end of the third resistor to receive current through the corresponding motor drive amplifier, wherein the overcurrent detection reference value is maintained from dividing the analog voltage by the first and second resistors;

wherein the first comparator outputs an overcurrent detection signal in response to the current inputted to the second terminal of the first comparator being more than the overcurrent detection reference value.

7. The drive system of claim 6, wherein the motor drive power supply comprises:

a storage for storing the maximum rated currents of the motor drive amplifiers;

a rectifier connected to the motor drive amplifiers via two output terminals of the rectifier and capable of converting alternating current voltage to direct current (DC) voltage; and a processor connected to the motor drive amplifiers, the storage, and the overcurrent detection apparatuses, for transmitting the maximum rated currents from the motor drive amplifiers to the overcurrent detection apparatuses correspondingly.

8. The drive system of claim 7, wherein a capacitor is connected across the two output terminals of the rectifier to smooth DC voltage from the rectifier.

9. The drive system of claim 7, further comprising a controller connected to the motor drive amplifiers, wherein the controller is capable for controlling the motor drive amplifiers to drive the motors.

10. The drive system of claim 9, wherein each motor drive amplifier comprises:

a control circuit connected between the controller and the processor;

a storing module connected to the first control circuit, capable for storing a type of one of the motor drive amplifiers; and an inverter circuit connected to the control circuit, the rectifier, and one of the motors, and capable for supplying power from the rectifier to the motor according to a control signal from the control circuit;

wherein the processor reads a type of the motor drive amplifier from the storing module via the control circuit, and reads a maximum rated current value from the storage according to the type of the motor drive amplifier.

11. A drive system for multiple motors comprising:

a plurality of motors;

a motor drive power supply for supplying power to the plurality of motors;

a controller;

a plurality of motor drive amplifiers, wherein each motor amplifier is connected between the motor drive power supply and a corresponding motor, for driving a corresponding one of the motors, wherein a maximum rated current value of each motor amplifier is stored in the motor drive power supply, wherein the controller is capable for controlling the motor drive amplifiers to drive the motors, each motor drive amplifier comprises:

a control circuit connected between the controller and the motor drive power supply;

a storing module connected to the control circuit, capable for storing a type of one of the motor drive amplifiers; and an inverter circuit connected to the control circuit, the motor drive power supply, and one of the motors, and capable for supplying power from the motor drive power supply to the corresponding motor according to a control signal from the control circuit;

wherein the motor drive power supply reads a type of the motor drive amplifier from the storing module via the control circuit, and reads a maximum rated current value from the motor drive power supply according to the type of the motor drive amplifier; and a plurality of overcurrent detection apparatuses, wherein each overcurrent detection apparatus is connected between the motor drive power supply and a corresponding one of the motor drive amplifiers for detecting current through the corresponding motor drive amplifier, and comparing the maximum rated current value to the current corresponding to output an overcurrent detection signal correspondingly.

* * * * *